United States Patent
Au et al.

(10) Patent No.: US 12,009,776 B2
(45) Date of Patent: Jun. 11, 2024

(54) VARIABLE RADIUS UNDER MODULE BALANCED BEARING

(71) Applicant: Nextracker Inc., Fremont, CA (US)

(72) Inventors: Alexander W. Au, Oakland, CA (US); Ricardo Delgado-Nanez, San Jose, CA (US)

(73) Assignee: NEXTRACKER LLC, Fremont, CA (US)

( * ) Notice: Subject to any disclaimer, the term of this patent is extended or adjusted under 35 U.S.C. 154(b) by 143 days.

(21) Appl. No.: 17/404,577

(22) Filed: Aug. 17, 2021

(65) Prior Publication Data

US 2022/0052636 A1 Feb. 17, 2022

Related U.S. Application Data

(60) Provisional application No. 63/066,660, filed on Aug. 17, 2020.

(51) Int. Cl.
*H02S 20/32* (2014.01)
*F16M 11/10* (2006.01)

(52) U.S. Cl.
CPC ............. *H02S 20/32* (2014.12); *F16M 11/10* (2013.01)

(58) Field of Classification Search
None
See application file for complete search history.

(56) References Cited

U.S. PATENT DOCUMENTS

| | | | |
|---|---|---|---|
| 5,379,859 A * | 1/1995 | Pigman | E04G 3/26 248/237 |
| 7,989,746 B2 | 8/2011 | Chen et al. | |
| 11,041,303 B2 * | 6/2021 | Marlow | E04B 1/2604 |
| 2007/0277868 A1 * | 12/2007 | Huang | F24S 50/20 136/246 |
| 2009/0211177 A1 * | 8/2009 | Grafton | E04D 3/3608 248/237 |
| 2010/0224750 A1 * | 9/2010 | Webber | F16M 11/10 248/288.11 |
| 2016/0329860 A1 * | 11/2016 | Kalus | H02S 20/10 |
| 2017/0102168 A1 | 4/2017 | Childress | |
| 2017/0237391 A1 | 8/2017 | Welle | |
| 2019/0296688 A1 | 9/2019 | Kresse et al. | |
| 2020/0052643 A1 | 2/2020 | Ballentine et al. | |
| 2021/0194418 A1 * | 6/2021 | Ballentine | F24S 30/42 |

FOREIGN PATENT DOCUMENTS

| | | |
|---|---|---|
| WO | 2018020452 A1 | 2/2018 |
| WO | 2018167643 A1 | 9/2018 |

OTHER PUBLICATIONS

PCT Search Report and Written Opinion issued in PCT Application No. PCT/US2021/046301 dated Nov. 30, 2021, 16 pages.

* cited by examiner

*Primary Examiner* — Steven M Marsh
(74) *Attorney, Agent, or Firm* — Fredrikson & Byron, P.A.

(57) ABSTRACT

A solar tracker bearing and a solar tracker incorporating the bearing, the bearing including at least one rotatable part, the rotatable part including a notch for receiving a torque tube, a slot, formed in the rotatable part and extending below the notch, the slot defining an arc having multiple radii, at least one engagement member configured to be received in the slot, and at least one base configured to secure the engagement member in the slot and to secure the bearing to a pier.

20 Claims, 20 Drawing Sheets

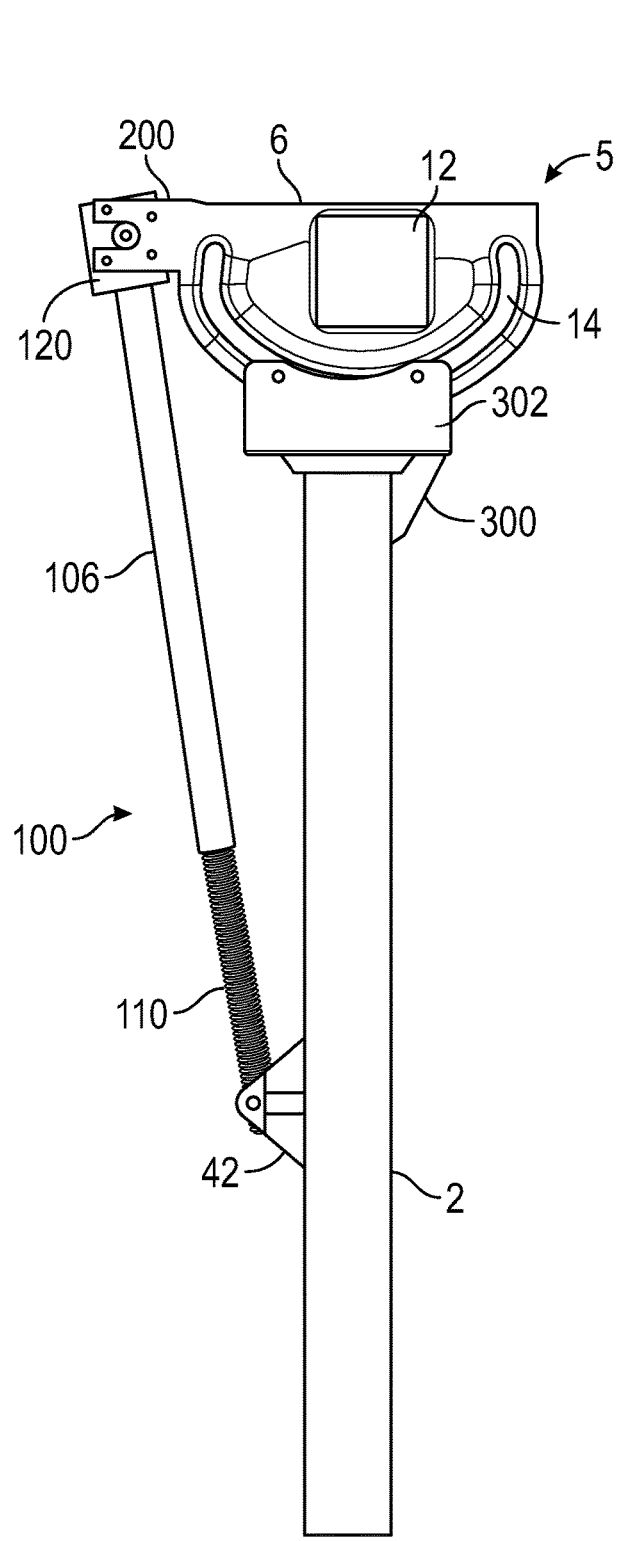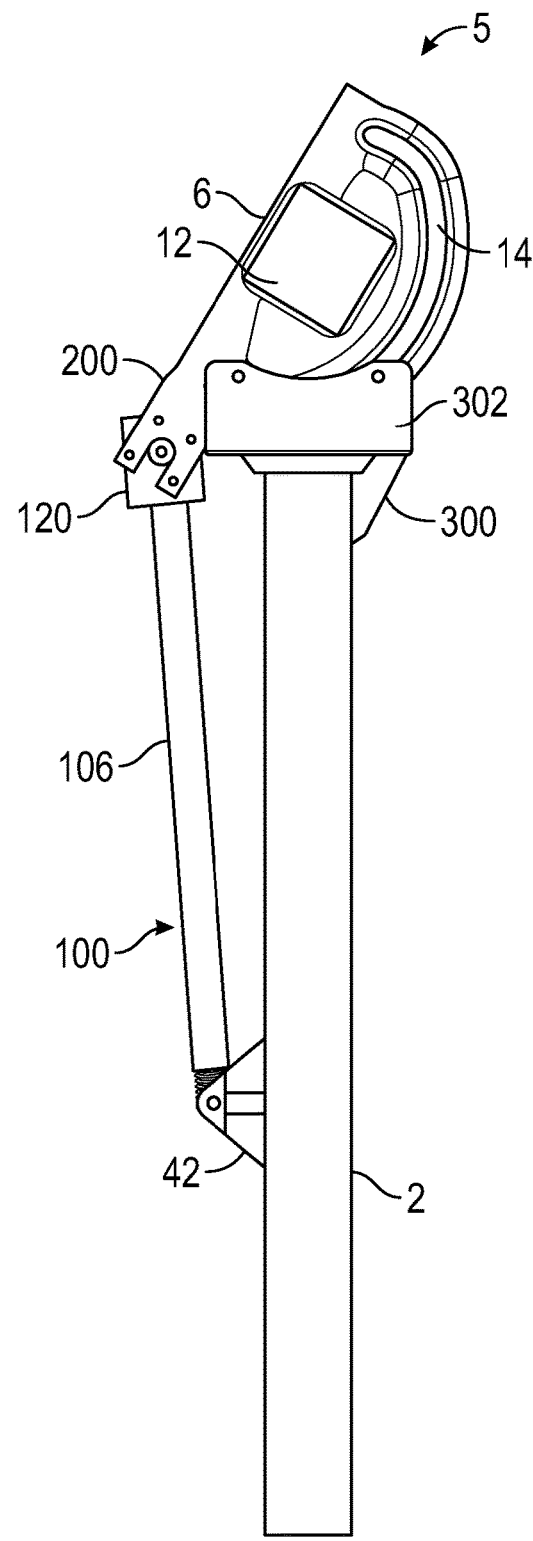
FIG. 14F
FIG. 14G

US 12,009,776 B2

VARIABLE RADIUS UNDER MODULE BALANCED BEARING

BACKGROUND

Technical Field

The present disclosure relates to solar power generation systems, and more particularly, to solar tracker actuating systems for adjusting the orientation of the solar power generation components to track the location of the sun.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length.

Adjusting massive solar trackers requires power to drive the solar array as it follows the sun. As will be appreciated, the greater the load, the greater the amount of power necessary to drive the solar tracker. An additional design constraint of such systems is the rigidity required to accommodate the weight of the solar arrays and at times significant wind loading.

Further, the torsional excitation caused by wind loading exerts significant force upon the structure for supporting and the mechanisms for articulating the solar tracker. As such, increases in the size and number of components to reduce torsional excitation are required at varying locations along the length of the solar tracker. The present disclosure seeks to address the shortcomings of prior tracker systems.

SUMMARY

One aspect of the disclosure is directed to a solar tracker bearing including: a first rotatable part, the rotatable part including a notch for receiving a torque tube; a slot, formed in the rotatable part and extending below the notch, the slot defining an arc having multiple radii; a first engagement member configured to be received in the slot; and at least one base configured to secure the engagement member in the slot and to secure the bearing to a pier.

Implementations of this aspect of the disclosure may include one or more of the following features. The solar tracker bearing where the slot includes a first radius at a bottom portion of the rotatable part, and a second radius proximate at least one termination of the slot where the second radius is smaller than the first radius. The solar tracker bearing further including a third radius proximate a second termination, where the third radius is larger than the first radius. The solar tracker bearing further including a third radius proximate a second termination, where the third radius opposes the first radius. The solar tracker bearing where the slot includes a first radius at a bottom portion of the rotatable part, and a second radius proximate at least one termination of the slot where the second radius is larger than the first radius. The solar tracker bearing where the slot includes a first radius at a bottom portion of the rotatable part, and a second radius proximate at least one termination of the slot where the second opposes the first radius. The solar tracker bearing further including a second rotatable part including a notch for receiving the torque tube. The solar tracker bearing where the second rotatable part includes a second slot extending below the notch and defining an arc having multiple radii, where the slot in the first rotatable part matches the slot in the second rotatable part. The solar tracker bearing further including at least a second engagement member. The solar tracker bearing where the first and second engagement member are received in a u-channel supported by the base to secure the first and second engagement members in their respective slots in the respective rotatable parts. The solar tracker bearing where the first and second engagement members each include two engagement members. The solar tracker bearing where each of the first and second rotatable parts include an actuator arm. The solar tracker bearing where the first and second rotatable parts are separated from one another by a gap. The solar tracker bearing where the gap is configured to receive a gear box of an articulation system. The solar tracker including a notch offset from a centerline of the rotatable part. The solar tracker bearing including an integrated actuator arm.

A further aspect of the disclosure is directed to a single axis solar tracker including: a torque tube, a plurality of photovoltaic panels supported by the torque tube. The single axis solar tracker also includes a plurality of piers, configured to support the torque tube and the photovoltaic panels; and a plurality of solar tracker bearings including, at least one rotatable part, the rotatable part including a notch for receiving the torque tube; a slot, formed in the rotatable part and extending below the notch, the slot defining an arc having multiple radii. The single axis solar tracker also includes at least one engagement member configured to be received in the slot. The single axis solar tracker also includes at least one base configured to secure the engagement member in the slot and to secure the bearing to one of the plurality of piers.

Implementations of this aspect of the disclosure may include one or more of the following features. The single axis solar tracker where the slot includes a first radius at a bottom portion of the rotatable part, and a second radius proximate at least one termination of the slot where the second radius is smaller than the first radius. The single axis solar tracker further including a third radius proximate a second termination, where the third radius is larger than the first radius. The single axis solar tracker where the slot includes a first radius at a bottom portion of the rotatable part, and a second radius proximate at least one termination of the slot where the second radius is larger than the first radius. The single axis solar tracker where the slot includes a first radius at a bottom portion of the rotatable part, and a second radius proximate at least one termination of the slot where the second opposes the first radius. The single axis solar tracker where the slot includes a third radius proximate a second termination, where the third radius opposes the first radius.

BRIEF DESCRIPTION OF THE DRAWINGS

Various aspects and features of the present disclosure are described hereinbelow with reference to the drawings, wherein:

FIGS. 14A-14G depict a bearing with two rotatable parts mounted on a pier and an actuating mechanism mounted between the rotatable parts in accordance with the disclosure.

DETAILED DESCRIPTION

The present disclosure is directed to solar tracking systems. More particularly, the disclosure is directed to a tracker support and bearing system for a single axis solar tracker employing a variable radius bearing.

Figure 1:
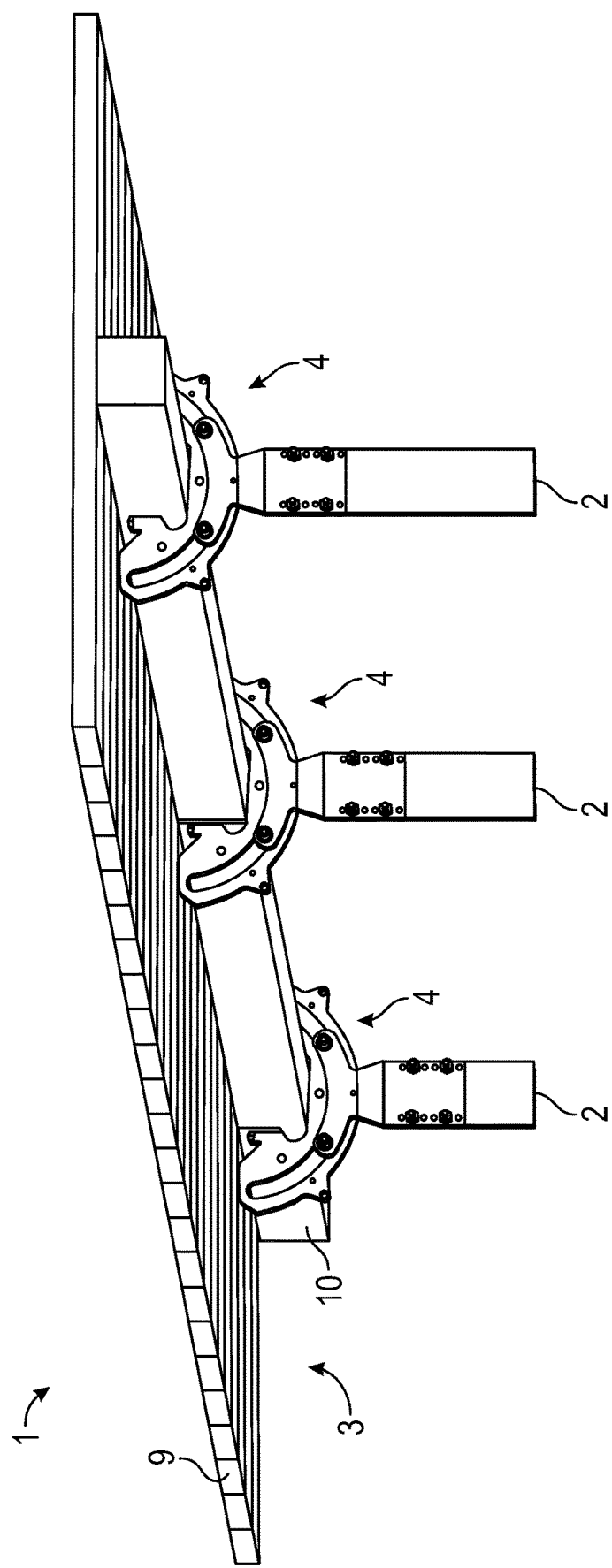
FIG. 1 is a perspective view of a solar tracker in accordance with the disclosure.
Figure 2:
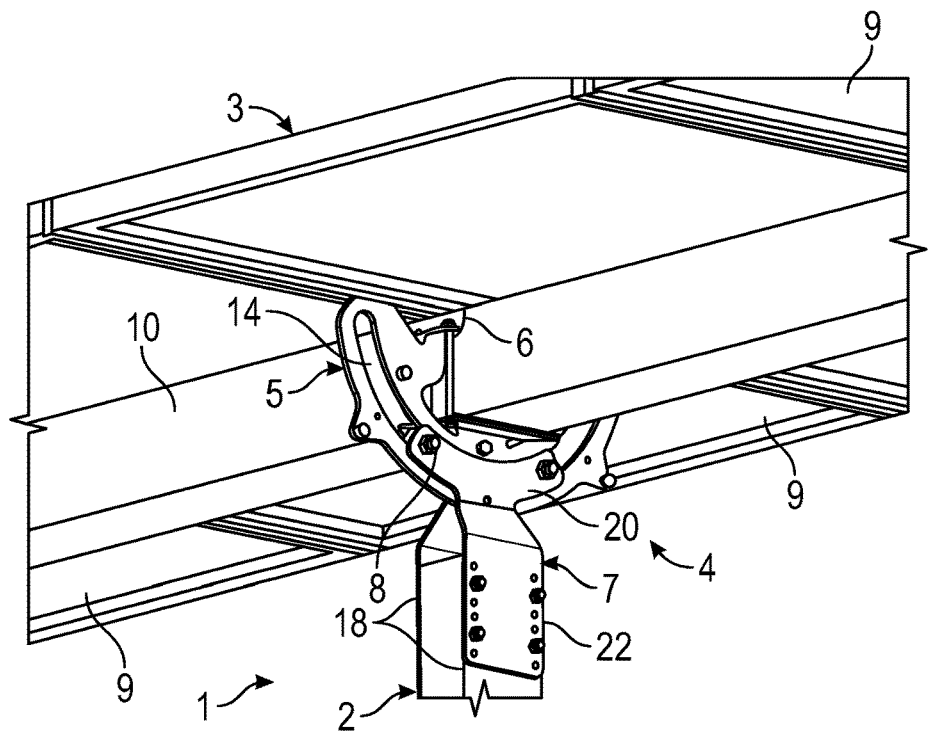
FIG. 2 is a perspective view of a bearing supporting a solar tracker in accordance with the disclosure.

FIG. 1 depicts a solar tracker 1. The solar tracker 1 includes a series of piers 2 for anchoring the solar tracker 1 in the ground. The piers 2 may be anchored in for example by pilling, screwing, bolting, ballasting, or any other means allowing fastening and stabilizing the tracker support system to the ground. This solar tracker 1 includes a movable structure 3 rotatably mounted on the piers 2 around a horizontal axis of rotation A (FIG. 3) and more specifically, rotatably mounted on the upper ends of the piers 2.

The movable structure 3 includes one or more parallel rails, not shown, which receive photovoltaic panels 9. The photovoltaic panels 9 may be fastened to the rails using a variety of fasteners and clamps as is known in the art. The movable structure 3 also includes a horizontal torque tube 10 to which the rails are connected, and which further support the photovoltaic panels 9. The torque tube 10 is rotatably mounted to the piers 2 about the horizontal axis of rotation A and is more specifically rotatably mounted on the upper ends of the piers 2 inside bearings 4.

The torque tube 10 extends along a horizontal central axis B and is in the form of a tubular beam of a square-shaped cross-section in the example illustrated in the figures. Of course, other cross-section shapes for the torque tube may be considered, such as circular and rectangular sections, etc.

Each bearing 4 is identical and includes a rotatable part 5 and a bracket 6 which secures the torque tube 10 in the bearing 5. A base 7 is used to secure the bearing 4 to the pier 2. Each bearing 4 includes engagement members 8. The engagement members 8 may be ball bearings, roller bearings, needle bearings, lubricious slides, or other types of engagement devices that allow the rotatable part 5 of the bearing to move relative to the engagement members 8.

The rotatable part 5 may be formed of a relatively thin plate of metal such as steel. The rotatable part 5 may also be formed of two metallic plates pressed and fastened to each other, for example by bolting, welding, riveting, etc.

Figure 3:
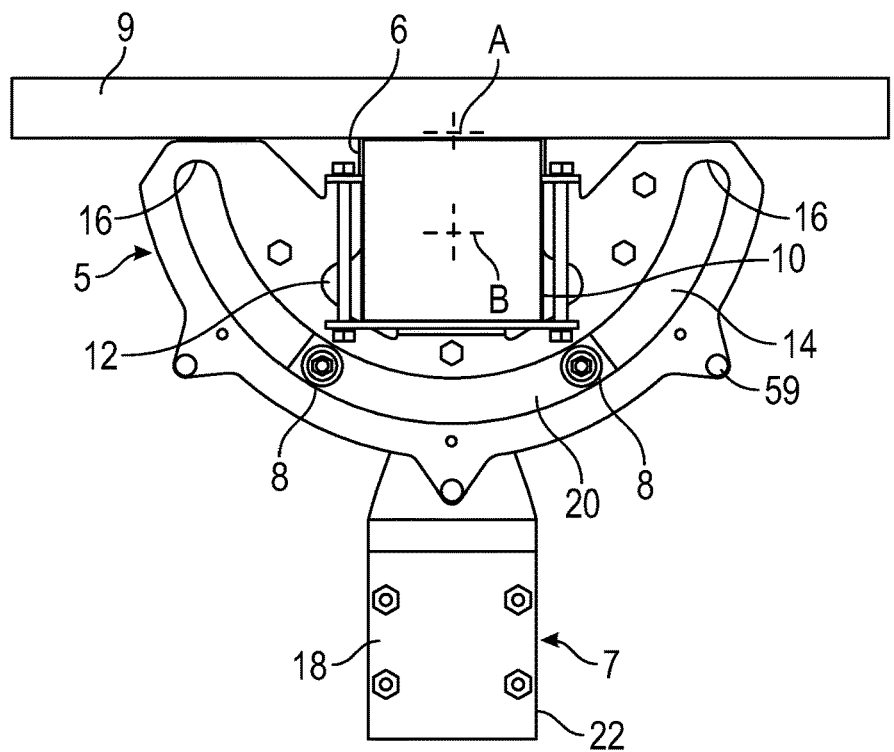
FIG. 3 is a plan view of a bearing in accordance with the disclosure.
Figure 4:
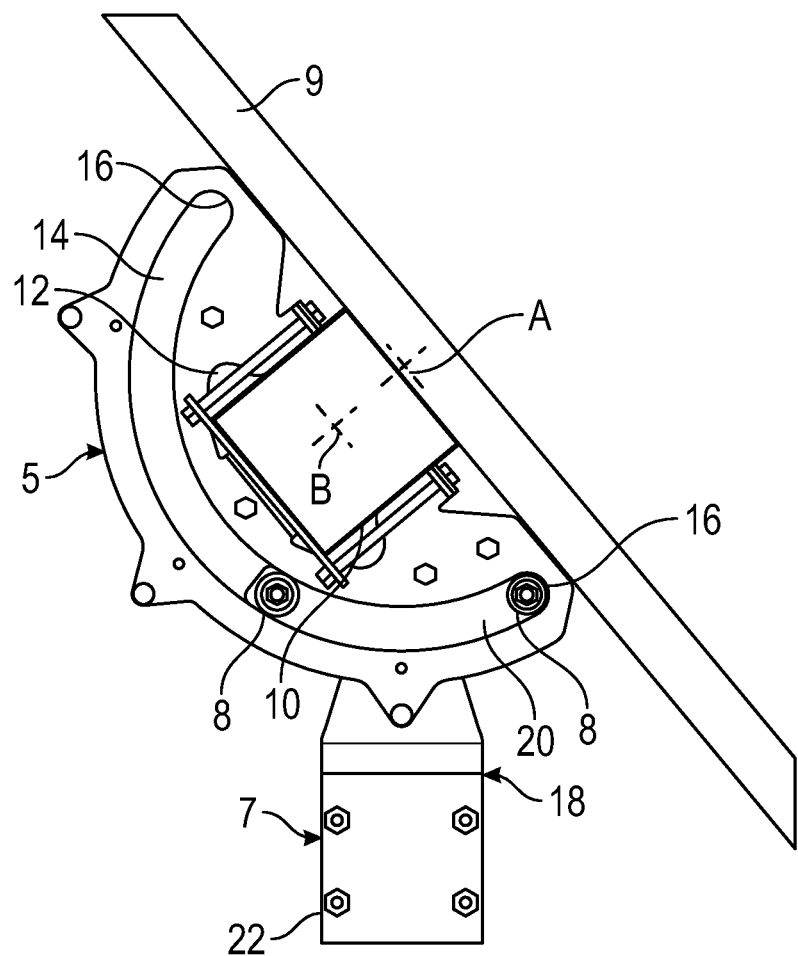
FIG. 4 is a plan view of a bearing in accordance with the disclosure.

The rotatable part 5 is generally semi-circular and includes a notch 12 for receiving the torque tube 10. The rotatable part 5 also includes slot 14 presenting a semicircular arc of between 120° and 180°, in particular between 150 and 170°. The slot 14 extends below the notch 12 and rises at the sides on either side of this notch 12. Thus, the notch 12 is located inside the inscribed imaginary circle centered on the horizontal axis of rotation A and following the slot 14. Referring to FIG. 3, the slot 14 presents two opposite terminations 16, forming stoppers for the engagement members 8. A bracket 6 closes the notch 12 of the rotatable part 5 and is fastened on this rotatable part 5 so as to clamp the torque tube 10 inside this notch 12.

As illustrated in FIG. 3, the notch 12 and the slot 14 are shaped so that the horizontal axis of rotation A is located above the central axis B of the torque tube 10 and preferably so that the horizontal axis of rotation A passes through the center of gravity G of the photovoltaic panels 9.

The base 7 is composed of two folded metallic plates 18 forming lateral elements surrounding the rotatable part 5. Each plate 18 comprises an upper portion 20 pierced with two holes for fastening two engagement members 8. The upper portions 20 of the two plates 18 are disposed on either side of the slot 14 of the rotatable part 5, and the engagement members 8 are fastened on these upper portions 20, between these upper portions 20 facing each other, for example via a bolt and nut set passing both through the aligned holes of the upper portions 20 and the engagement members 8. Each plate 18 includes a lower portion 22 which may be pierced with holes for a fastening by bolting to a pier 2 or configured to be welded to a pier 2.

The engagement members 8 are mounted so as to roll or slide in slot 14 and are interposed between these upper portions 20 which hold them in place in the slot 14. Thus, when the solar tracker 1 rotates, the rotatable part 5 pivots with the torque tube 10, this pivoting of the rotatable part 5 relative to the fixed base 7 is enabled by and guided by the contact of the engagement members 8 inside the slot 14 of the rotatable part 5.

Figure 5:
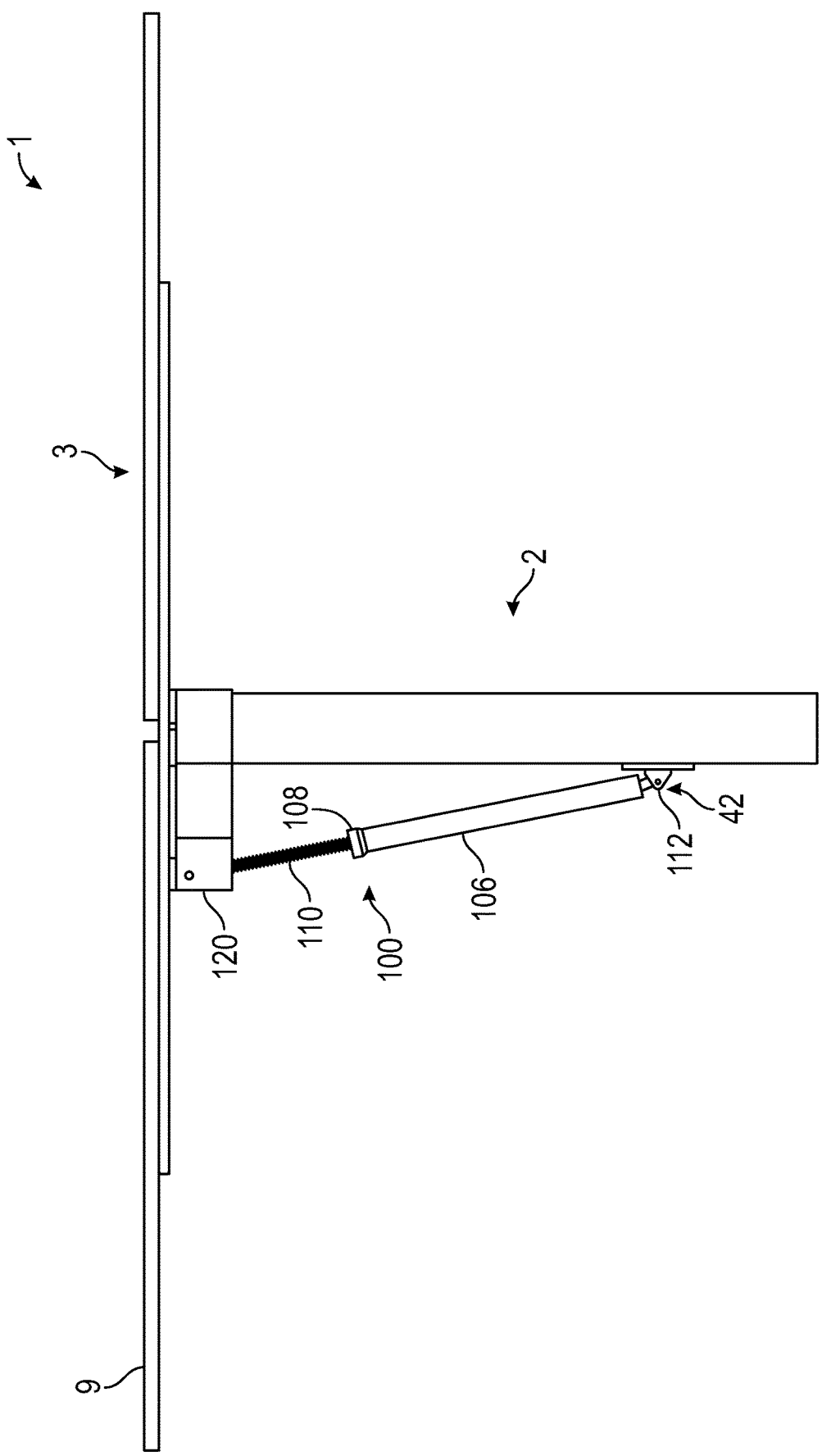
FIG. 5 is a plan view of a solar tracker in accordance with the disclosure.
Figure 6:
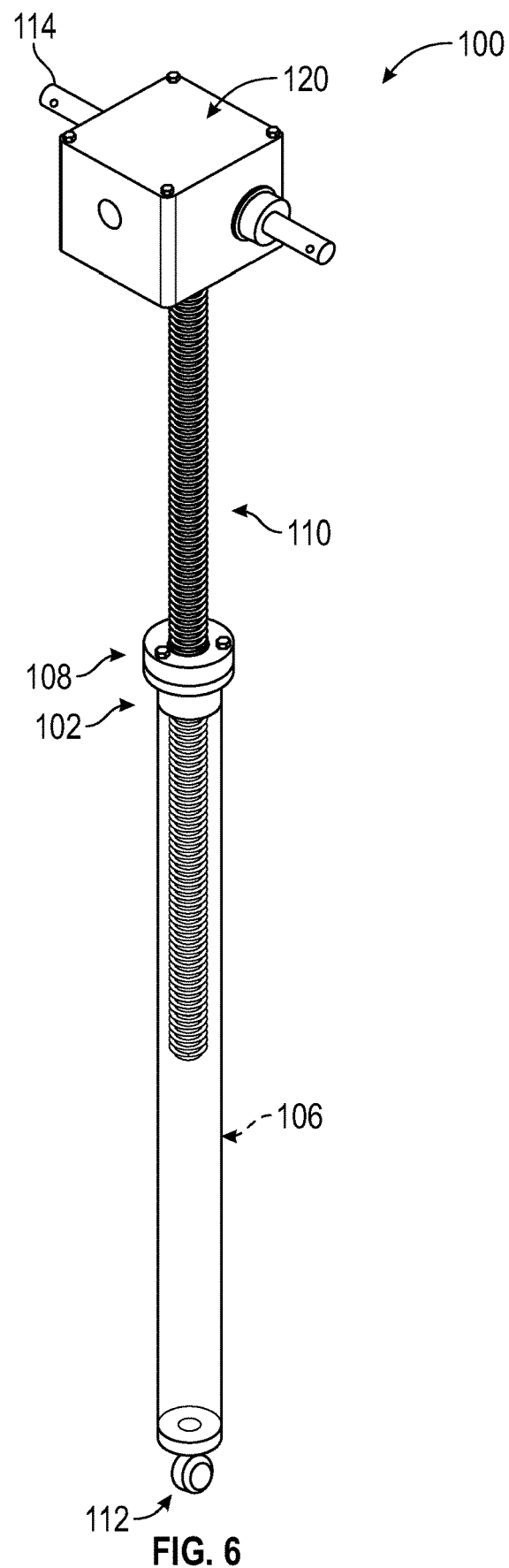
FIG. 6 is a perspective view of an actuation mechanism in accordance with the disclosure.

FIG. 5 depicts an end view of a single axis solar tracker 1 configured with an articulation system 100. The articulation system 100 is more clearly depicted in FIG. 6 to include an actuator 102 and a gearbox 120. The actuator 102 includes a tubular body 106, a nut 108, a power screw 110, and a heim joint assembly 112. Although generally illustrated as having a cylindrical profile, it is contemplated that the tubular body 106 may include any suitable profile, such as square, rectangular, oval, hexagonal, etc. A heim joint assembly 112 is formed on one end of the actuator opposite the gear box 120.

An actuator mounting flange 42 is disposed on an outer surface of the pier 2 and is configured to enable a pin (not shown) or other suitable means for rotatably coupling a portion of the articulation system 100 thereto. Specifically, the heim joint 112, formed at one end of the tubular body 106, is received in the mounting flange to secure the articulation system to the pier 2.

The power screw 110 includes a thread form that is complimentary to that of the nut 108 such that the power screw 110 may threadably engage the threaded bore of the nut 108. In this manner, as the power screw 110 is rotated in a first direction, the overall length of the actuator 102 increases and as the power screw 110 is rotated in a second, opposite direction, the overall length of the actuator 102 decreases. The increase or decrease in the overall length of the actuator 102 causes rotation of the solar tracker 1.

The gear box 120 is connected via a shaft 114 to a drive motor (not shown). The shaft 114 enters the gear box 120 and is coupled via gearing in the gear box 120 to the power screw 110. Rotation of the shaft 114, by the drive motor results in rotation of the power screw to drive the solar tracker 1 to a desired position. The gear box 120 may also include an output shaft which couples to the next gear box 120 of the solar tracker 1. In this way a single drive motor can synchronously drive each actuator 102 to move the entire length of the solar tracker 1.

Figure 7A:
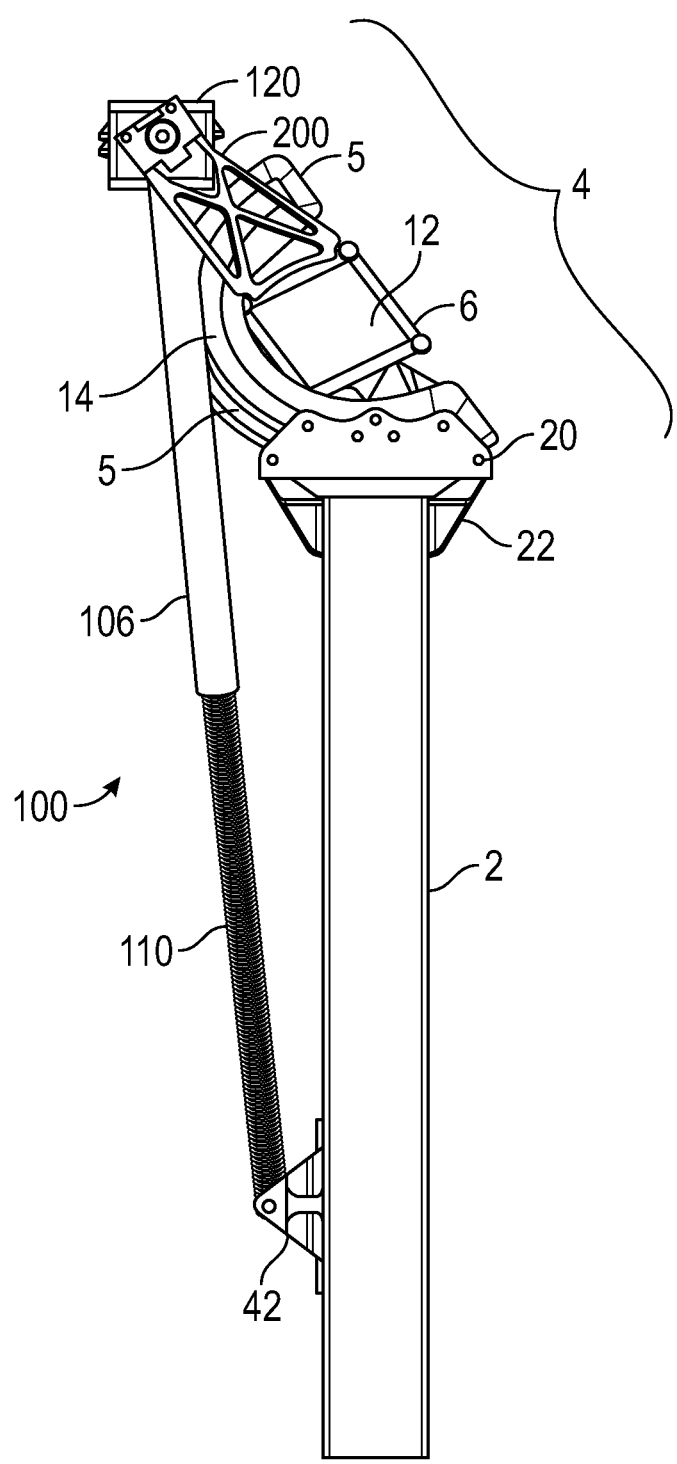
FIGS. 7A and 7B are side views of an actuation mechanism and a bearing in accordance with the disclosure.
Figure 7B:
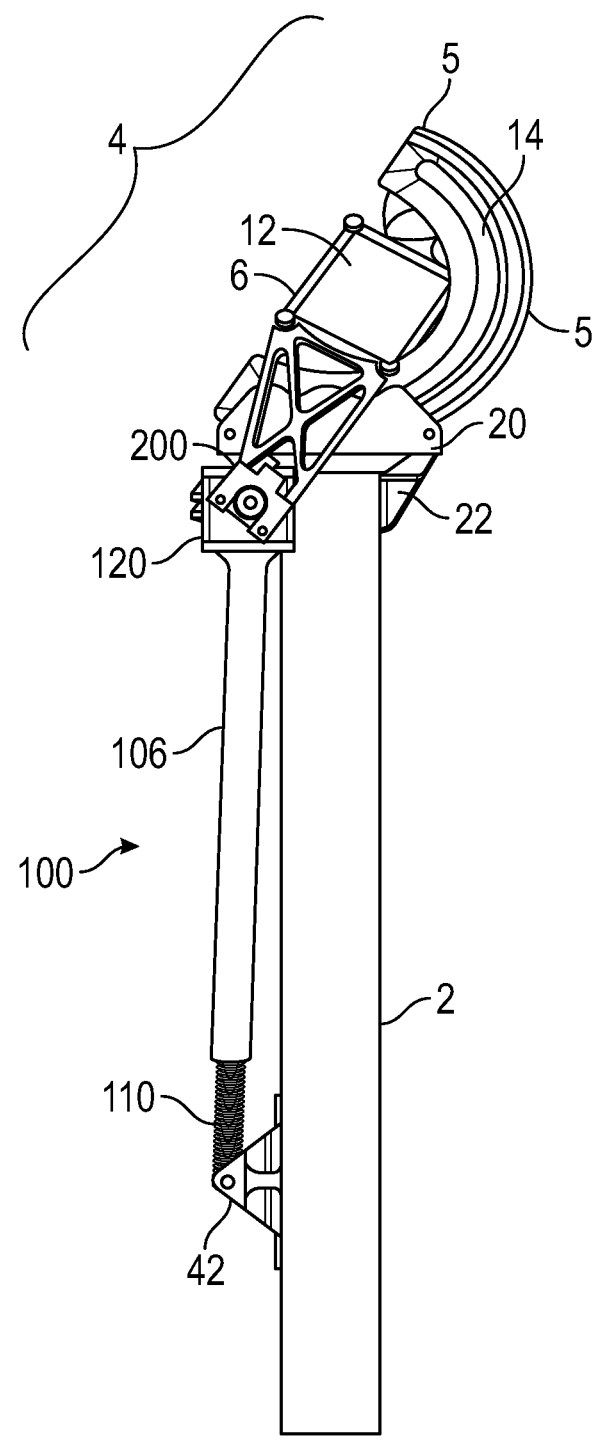

As will be appreciated, incorporating the articulation system 100 and the bearing 4 into a single solar tracker 1 can result in some challenges. As depicted in FIGS. 7A and 7B, an articulation system 100 is operably connected to a bearing 4 mounted on a pier 2. Because the solar tracker 1 has just a single torque tube 10, an actuator arm 200 is required to provide a location to mount the gear box 120, and to provide a moment arm to drive the torque tube 10 so that it rotates in the bearing 4 and therewith changes the orientation of the photovoltaic panels 9. However, as depicted in both FIG. 7A and FIG. 7B if the actuator arm 200 is too short, there are interferences between the gear box end of the articulation system 100 and the pier 2 at the high angles of movement of the torque tube 10.

Figure 8A:
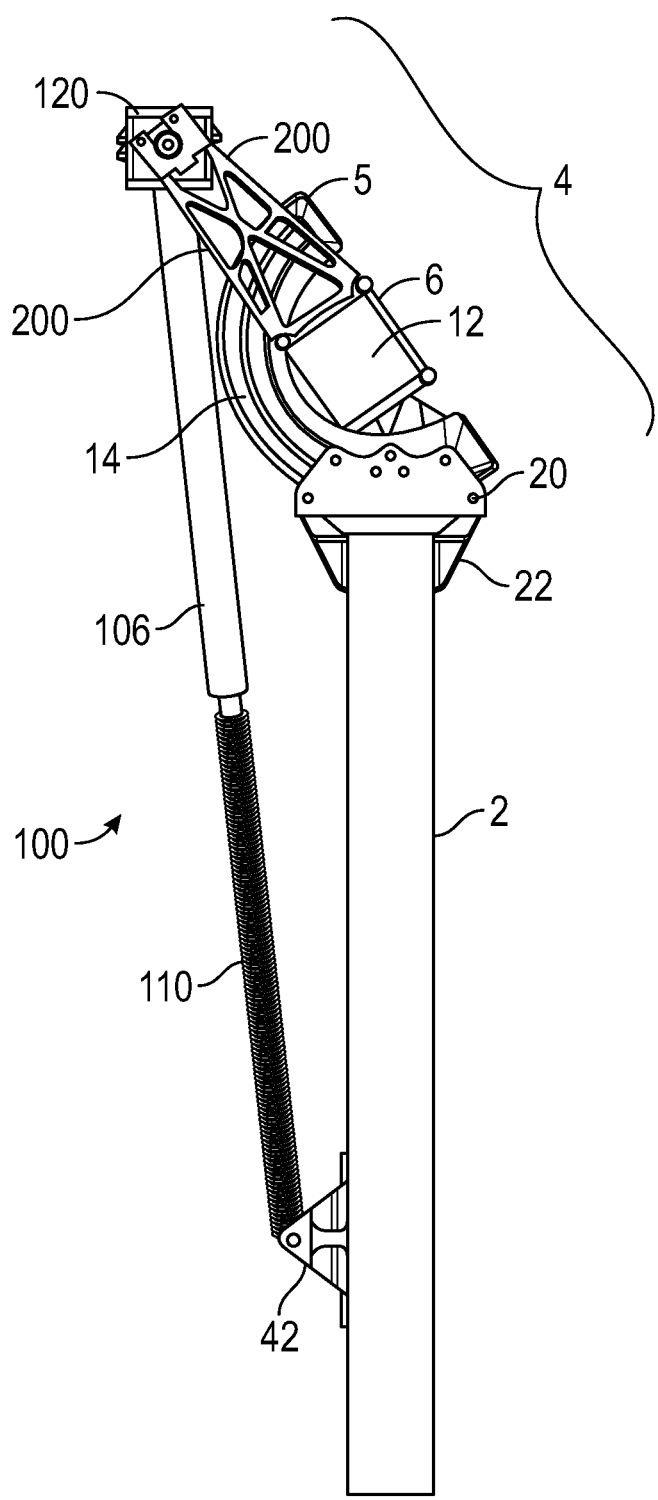
FIGS. 8A and 8B and 8C are side views of an actuation mechanism and a bearing in accordance with the disclosure.
Figure 8B:
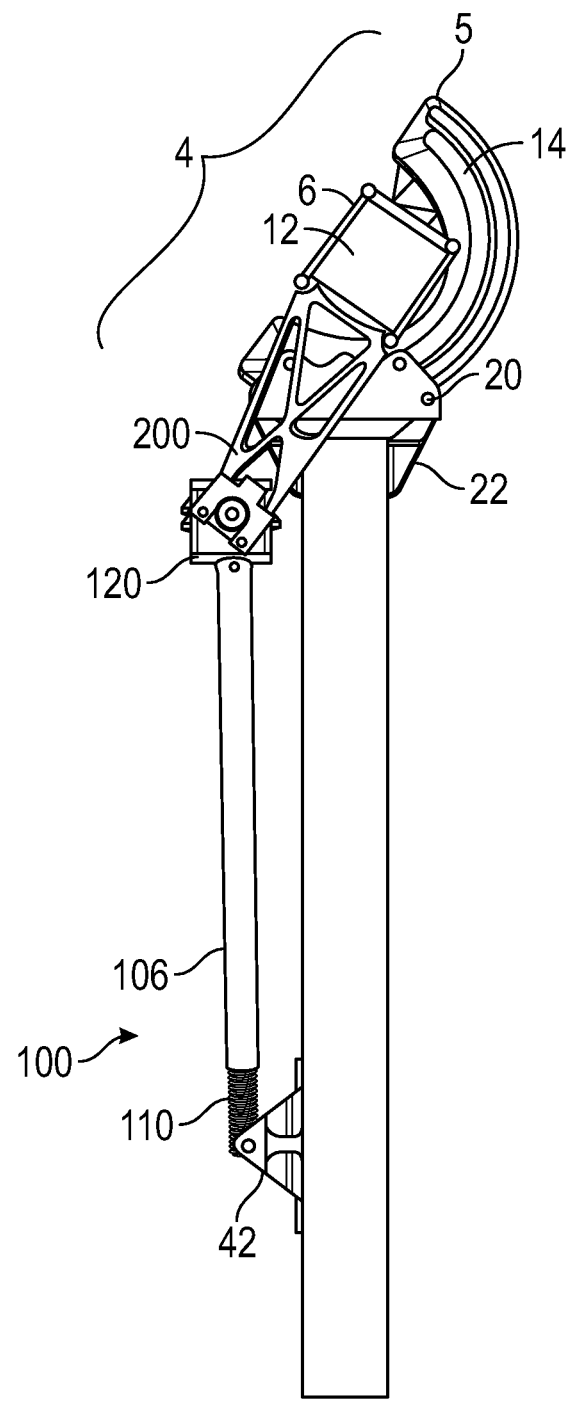
Figure 8C:
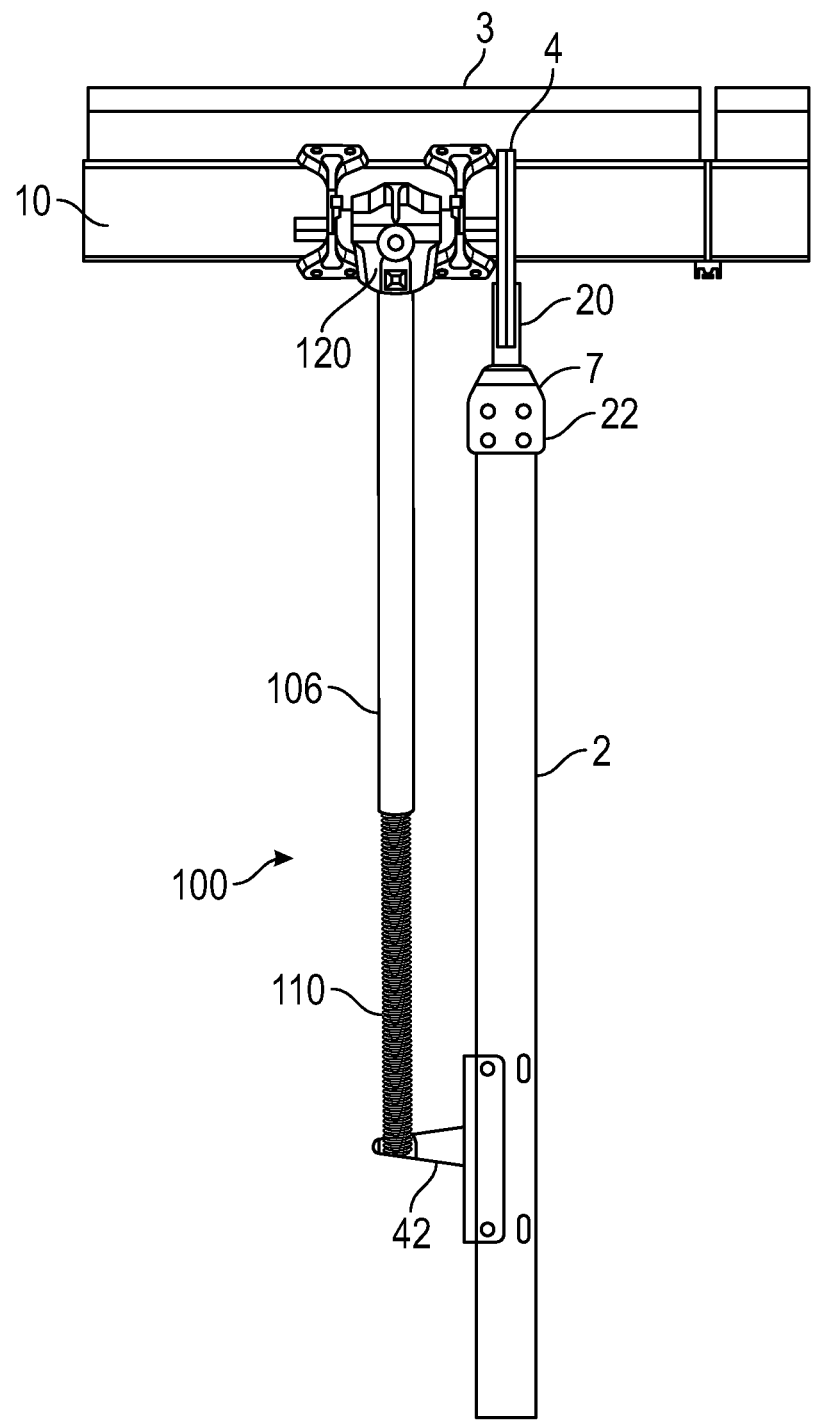

To address the interference issue, a longer actuator arm 200 may be employed as depicted in FIGS. 8A and 8B. Alternatively, the coupling of the actuator arm 200 to the torque tube 10 can be offset from the bearing 4 as depicted in FIG. 8C. However, these solutions have trade-offs that can have a commercial impact. With respect to the longer actuator arms 200, this results in the need for a longer articulation system 100. This entails longer tubular body 106, longer power screws 110 and potentially longer/taller piers 2 to accommodate the positioning of the mounting flange 42 at a lower position on the pier 2. This movement of the mounting flange 42 is necessary because of the increased length of the articulation system 100 when in the compressed position as seen in FIG. 8B.

With respect to offsetting the actuator arm 200 from the bearing 4 as depicted in FIG. 8C, this too has drawbacks. A first drawback is that by offsetting the actuator arm 200, the loads associated with the driving of the solar tracker 1 are not centered on the pier 2. This offsetting creates a variety of moments on the solar tracker 1 and induces twist to a variety of components of the solar tracker. Thus, to avoid this twisting, with existing componentry the capacity of the solar tracker 1 is reduced. Alternatively, the components can be upgraded to overcome the twist and other issues, but with added cost making it a potentially commercial impossibility.

Figure 9A:
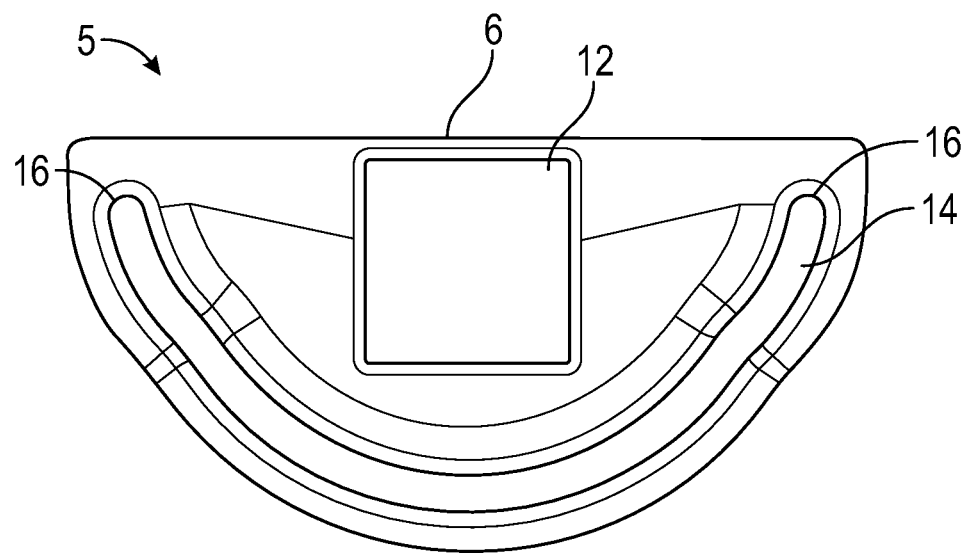
FIGS. 9A, 10A, and 11A are side views of rotatable parts of a bearing depicting variations in their respective slots in accordance with the disclosure.
Figure 9B:
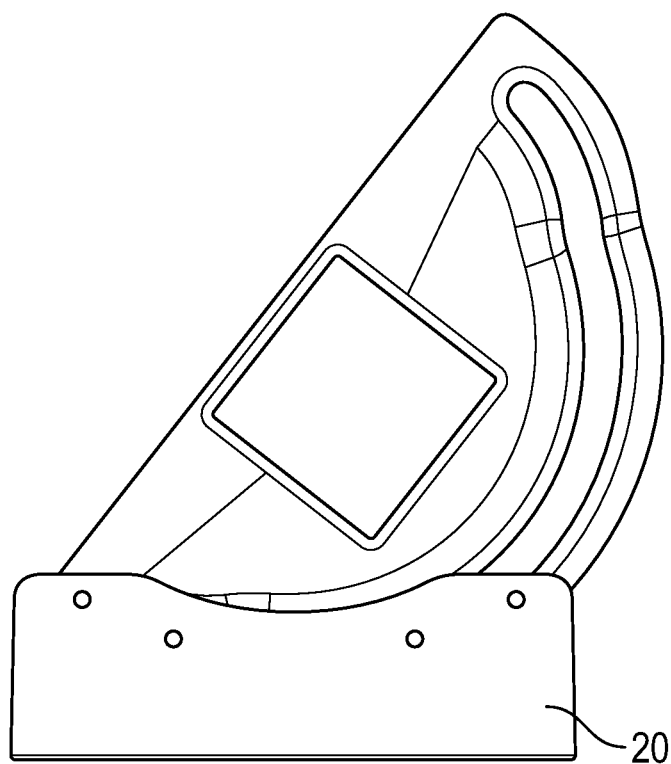
FIGS. 9B, 10B, and 11B are side views of the rotatable parts of FIGS. 9A, 10A, and 10C as they are rotated in a bearing as compared to a rotatable part with a uniform radius slot in accordance with the disclosure.
Figure 10A:
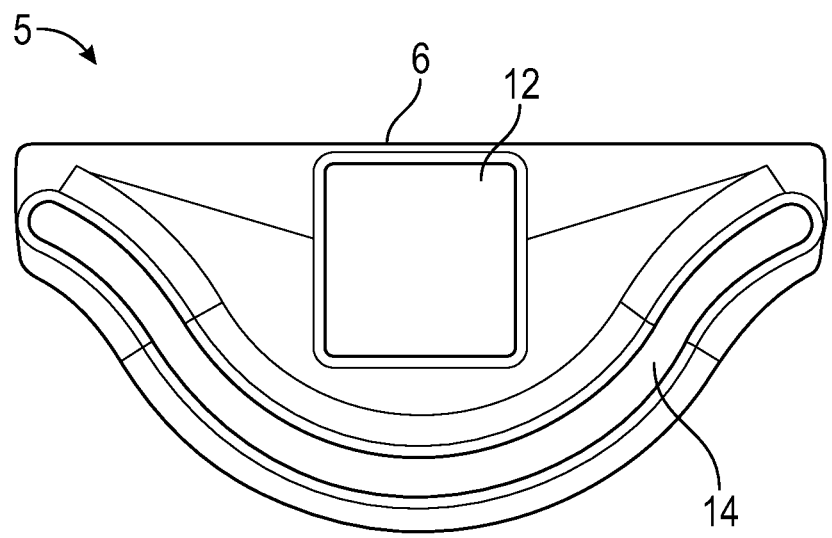
Figure 10B:
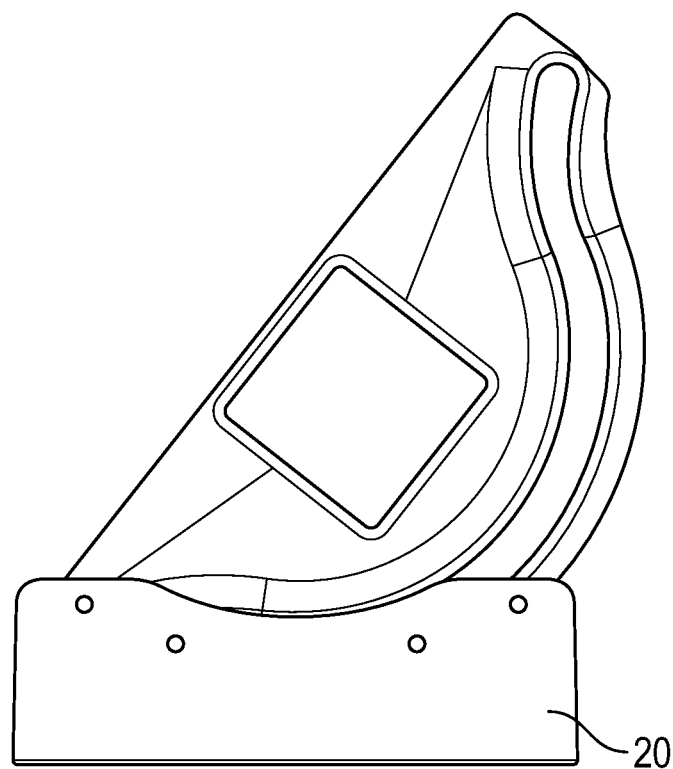

One aspect of the instant disclosure is directed to further alternative arrangements for the incorporation of the bearing 4 into the solar tracker 1. One alternative is to change the shape of the slot 14 in the rotating part 5 of the bearing 4. FIGS. 9A-11C depict a rotation part 5 having three different shaped slots 14. By altering the shape of the slot 14, the movement of the solar tracker 1, is altered in comparison to bearings 4 having a constant radius arc slot as depicted in FIG. 3. The results of these changes can be seen in FIGS. 9B, 10B, 11B, where the rotation of the rotatable part 5 having multiple radii is compared to a rotatable part having a constant radius. In FIGS. 9B and 10B by changing the radius of the slot 14 so that it is larger and the ends as compared to a center portion of the slot 14, the rotatable part 5 of the bearing 4 actually moves horizontally away from the pier 2 on which the bearing 4 is mounted. In FIG. 11B, the opposite effect is observed, and the rotatable part is drawn horizontally towards the pier 2. Accordingly, one aspect of the disclosure is directed to a solar tracker 1 and particularly a bearing 4 having a rotatable part 5 with a variable radius slot 14 formed therein. The exact parameters of the variable radius slot 14 can depend on the application and the other components being employed in the solar tracker 1. As depicted in FIG. 9A, the variable radius may simply be portion of the slot 14 towards the terminations 16 is formed with a larger radius the slot 14 at a bottom portion of the rotatable part 5. Alternatively, as depicted in FIG. 10A, the variable radius may take on a more sinusoidal shape and define an opposing arcs with opposing radii such that nearer the terminations the slot 14 is defined by an arc that opposes the arc at the bottom portion of the rotatable part 5. Still further, in FIG. 11A the slot 14 includes a radius proximate the terminations that is smaller than the radius at the bottom portion of the rotatable part.

Figure 11A:
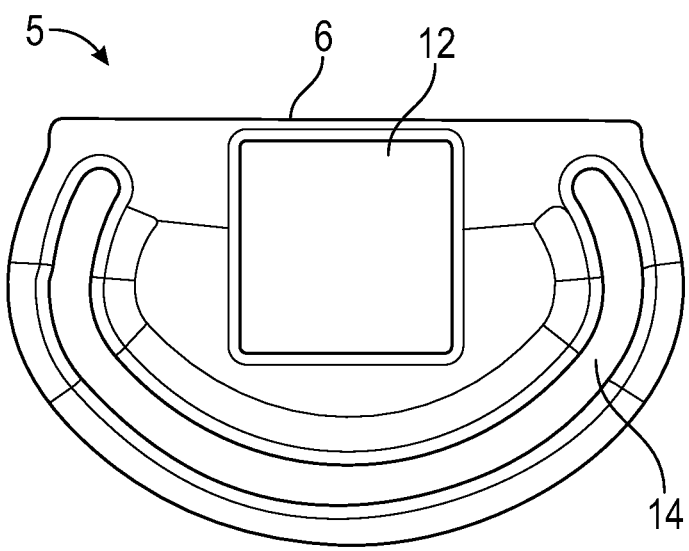
Figure 11B:
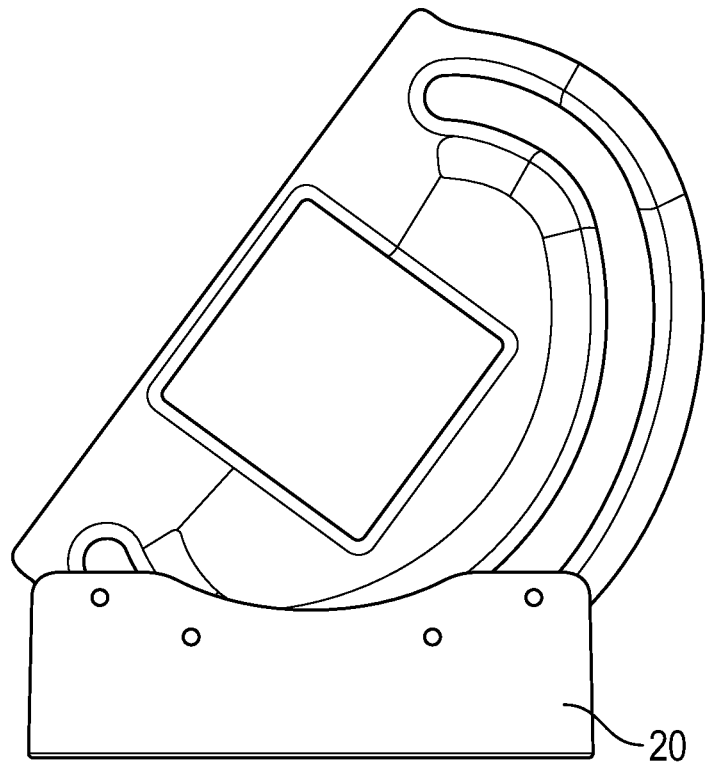
Figure 12B:
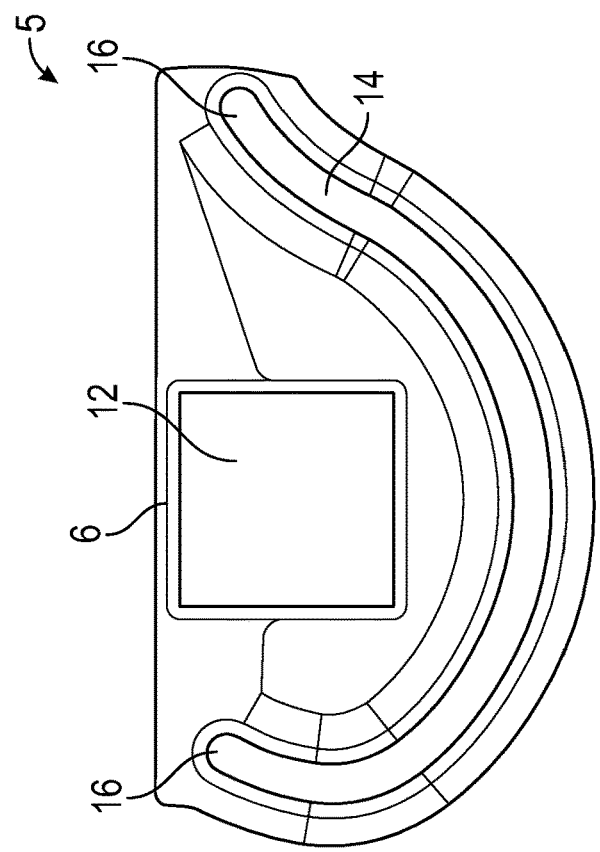
FIGS. 12A and 12B are side views of a rotatable part of a bearing with a variable radius slot formed of a composite of at least three radii in accordance with the disclosure.
Figure 12A:
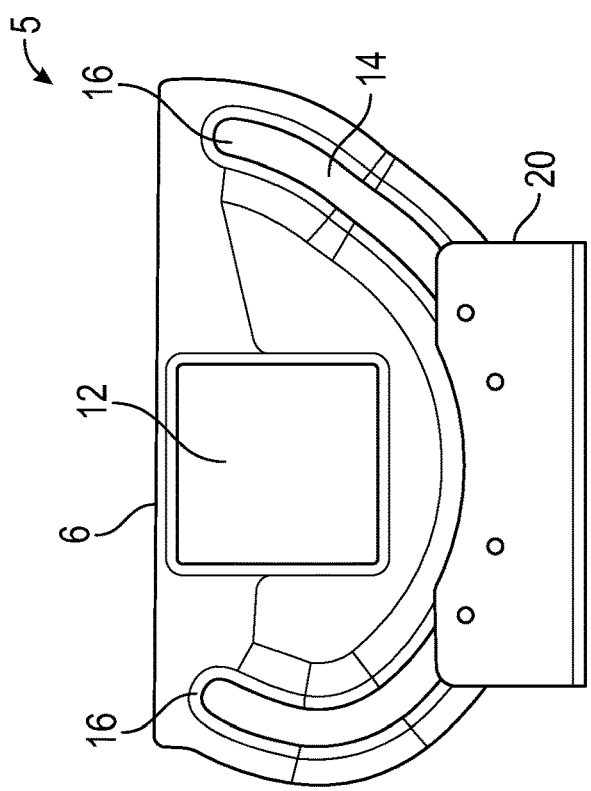

A further aspect of the disclosure is depicted in FIGS. 12A and 12B where the shape of the slots depicted in FIGS. 9A and 11A and 10A and 11A are respectively combined. As depicted in FIG. 12A the left side of the slot 14 has a shape which corresponds to that of FIG. 11A and the right side corresponds to that of FIG. 9A. Similarly, in FIG. 12B the left side of the slot 14 corresponds to that of FIG. 12A while the right side corresponds to that of FIG. 10A. This combination of profiles yields an arc of movement of the torque tube 10 as it rotates that place the torque tube 10 predominately on one side of a centerline of the pier 2 and the bearing 4 mounted therein the solar tracker's range of motion when compared to a constant radius. Because, the articulation system 100 is connected to the torque tube 10 on just one side of the pier 2, and only experience interference at the high angles of rotation of the torque tube 10 on that side of the pier 2, the result is a slot 14 which is beneficial in eliminating the interference without significantly impacting other aspects of the design of the solar tracker 1.

Figure 13A:
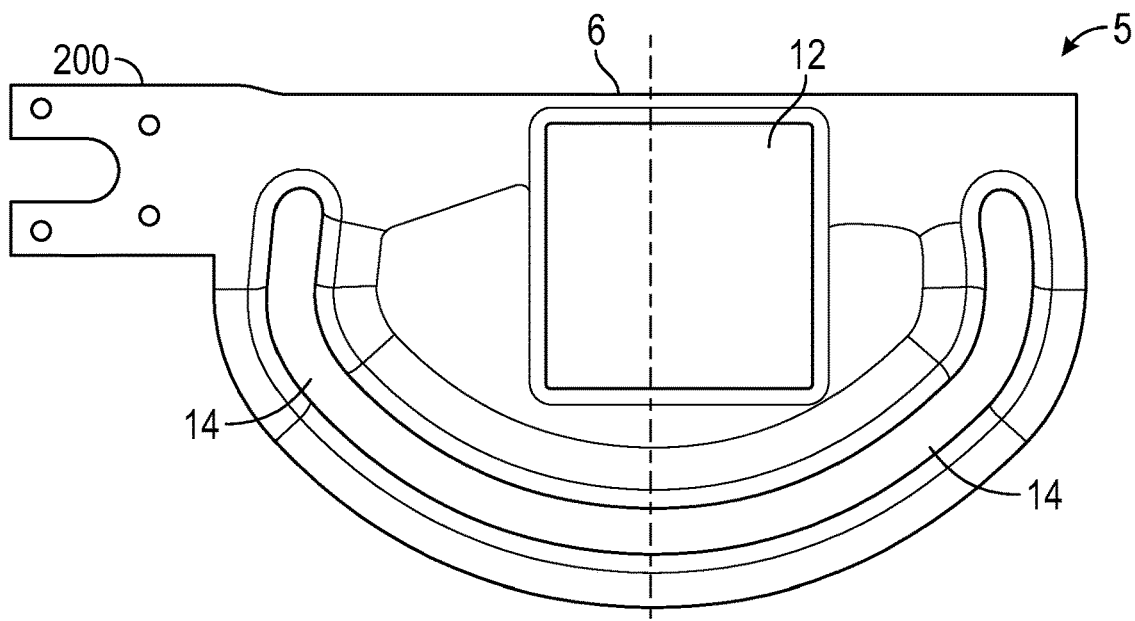
FIG. 13A depicts a side view of a rotatable part of a bearing where the notch is shifted in the direction away from an actuator arm in accordance with the disclosure.
Figure 13B:
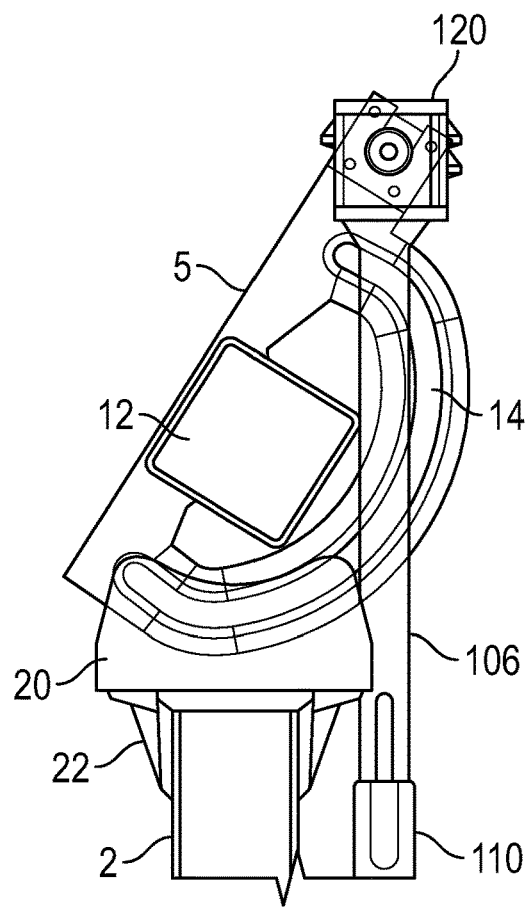
FIG. 13B depicts the effect of shifting the notch in improving the clearance of the actuation mechanism as the rotatable part is moved to a high angle position in accordance with the disclosure.

A further aspect of the disclosure is directed to the placement of the notch 12 in the rotatable part. As depicted in FIGS. 13A and 13B, the centerline of the notch 12 can be offset to one side of the rotatable part 5. As depicted in FIG. 13A the centerline of the notch 12 is moved away from the actuator arm 200 and the location where the gear box 120 and actuation system 100 are connected to the rotatable part 5. This movement of the centerline of the notch 12 helps in balancing the loads on either side of the bearing 4. As noted above, on the side of the solar tracker 1 including the actuation system 100, there are gear boxes 120, shafts 114, the actuator arm 200, and other components which increase the weight of the solar tracker 1 on that side of the bearing 4. By shifting the centerline of the notch 12 in the direction of the actuation system 100, the moment arm of that side of the solar tracker 1 is reduced, and that of the opposite side is increased. The result is that solar tracker 1 is in fact more balanced than if the notch 12 were centered in the bearing 4. Those of skill in the art will recognize that the actuator arm 200 of FIGS. 13A and B is an integrated actuator arm formed as a single component with the rotatable part 5. Alternatively, the actuator arm may be a separate component secured to the rotatable part 5, as depicted in FIGS. 7A and 7B.

Further, another aspect of movement of the centerline of the notch 12 is that the effective length of the actuator arm 200 is increased, but the actual length it extends from the rotating part 5 can be reduced in length. Still further the clearance between the actuation system 100 and the torque tube 10 is increased, particularly at high angular orientations as depicted in FIG. 13B. Though depicted in FIGS. 13A and 13B as employing the rotatable part 5 of FIG. 11A, any of the variable radius rotatable parts 5 described herein may be employed in this embodiment.

As depicted in FIGS. 9A, 10A, 11A, 12A and B and 13A and B, the effective radius of the slot 14 changes as the rotatable part 5 rotates relative to the engagement members 8 (FIG. 3) which are held in place by the upper portions 20 of the plates 18 mounted on the pier 2. The result is a bearing 4 where the center of rotation is neither coincident with the center of the torque tube 10 nor coincident with the center of gravity of the solar tracker 1 through the entirety of the solar tracker's rotation. While this may result in some unbalancing of the solar tracker 1 at certain portions of the rotation of the solar tracker 1, this unbalancing caused by the change in the center of rotation has several benefits. As an initial matter, the unbalancing, which is caused by the change in radius of the slot 14, eliminates interference with the actuator 100 as depicted in FIGS. 7A and 7B. Second, in some situations the actuation systems 100 may be shortened resulting in a weight and therefore power savings in the operation of the solar tracker 1. Further, the unbalancing allows for the shortening of the actuator arms 200. Finally, the change in radius can achieve a reduction in the necessary height of the pier 2.

Still a further aspect of the disclosure can be seen with reference to FIGS. 14A-14G. In FIGS. 14A-14G, a bearing 4 is depicted having two rotatable parts 5. Each pier 2 is affixed with at least one base 300. The base 300 includes two U-channels 302. The U-channels support a pair of engagement members 8 in each U-Channel. Each pair of engagement members 8 ride in a slot 14 of a rotatable part 5. The actuator arms 200 of the rotatable parts are received on and connected to opposite sides of a gear box 120. A gap 304 of approximately the width of the gear box 120 separates the two rotatable parts. The gap 304 eliminates interference issues described in connection with FIG. 7A, while allowing the actuation system 100 to remain centered on the pier 2. Further, as depicted in FIGS. 14A-14G, the actuator arm 200 is integral with the rotatable part 5, however, it may also be formed of an attached component as shown in FIG. 7A.

Figure 14A:
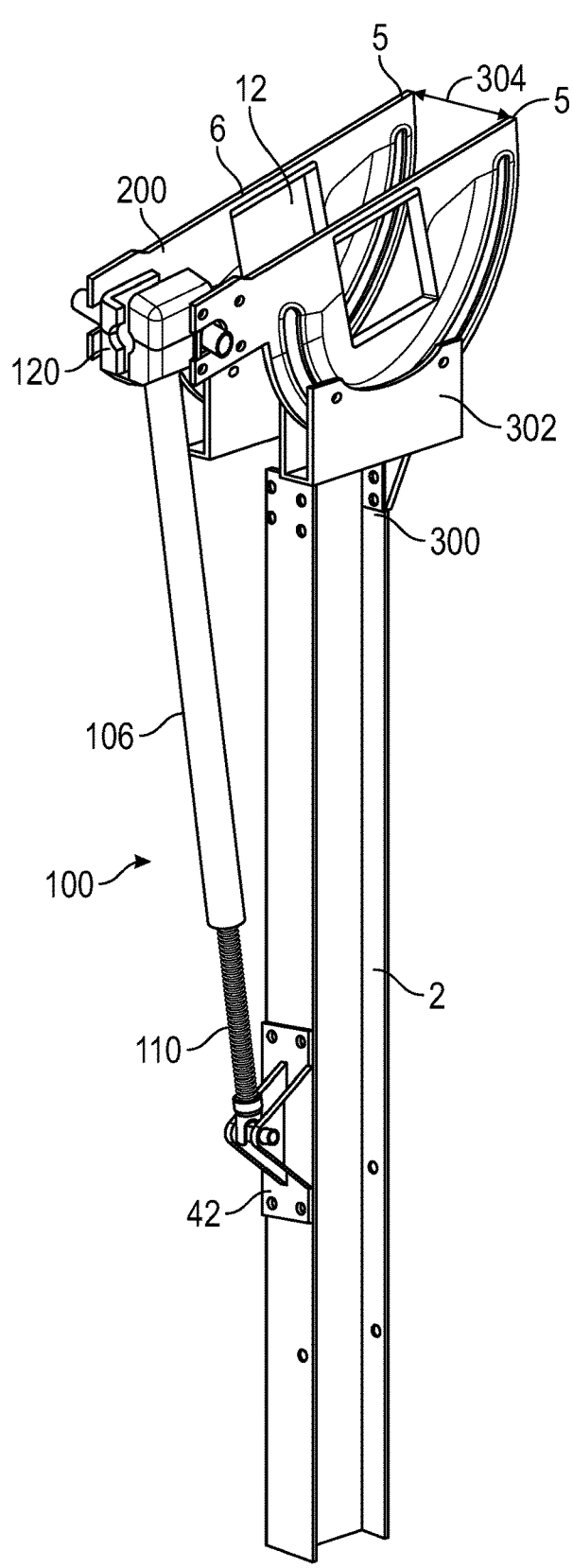
Figure 14B:
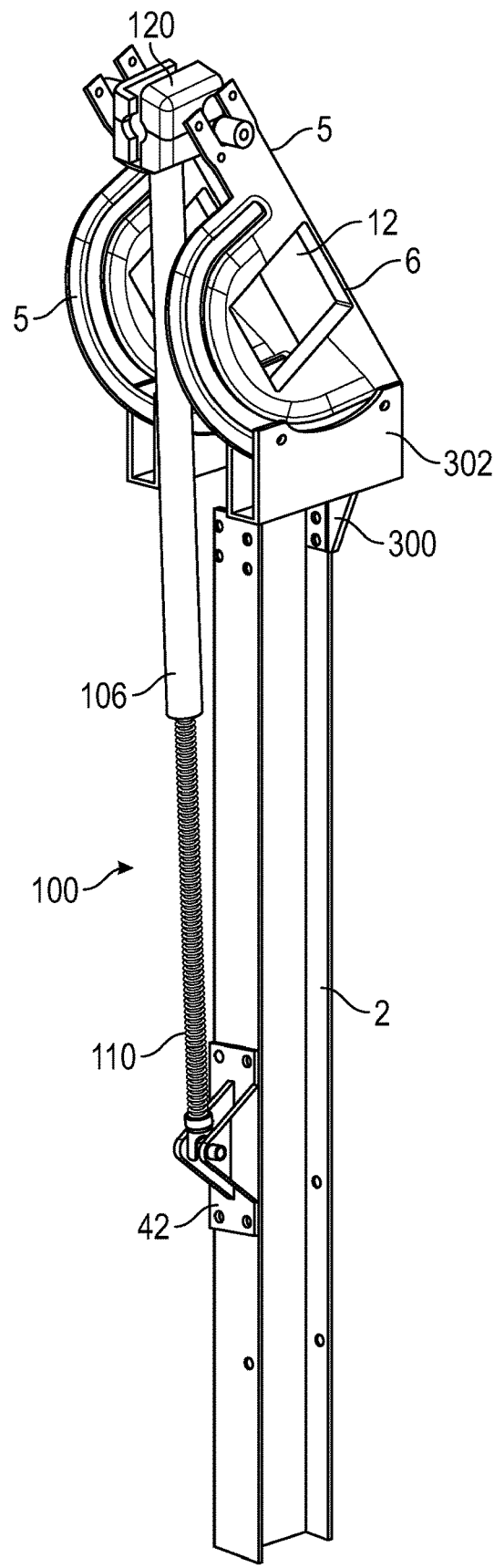
Figure 14C:
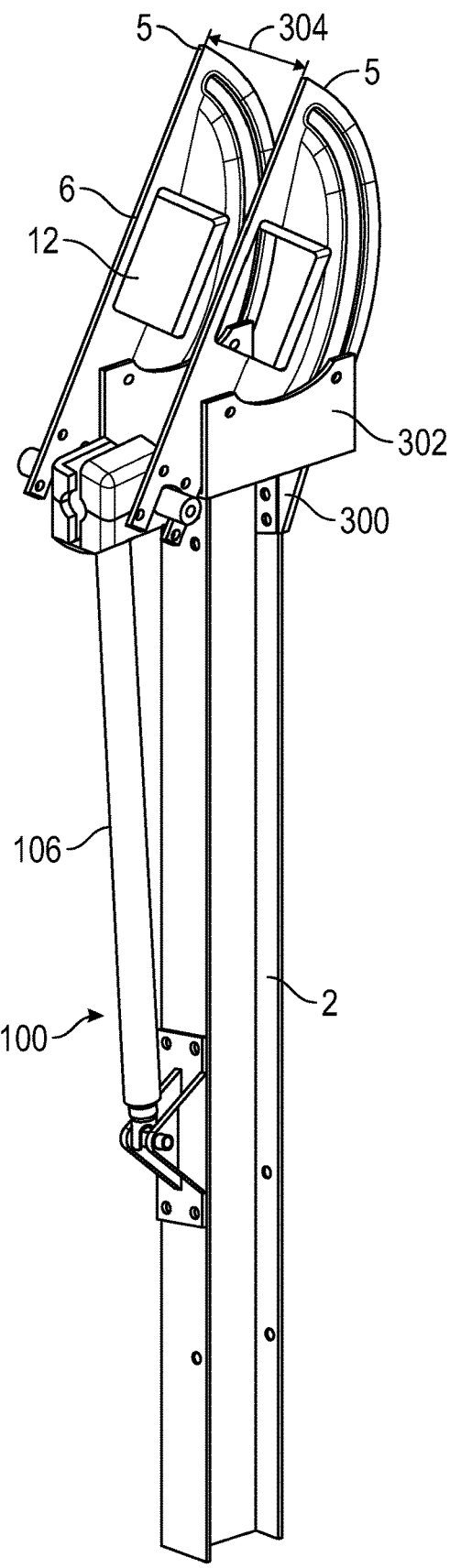
Figure 14D:
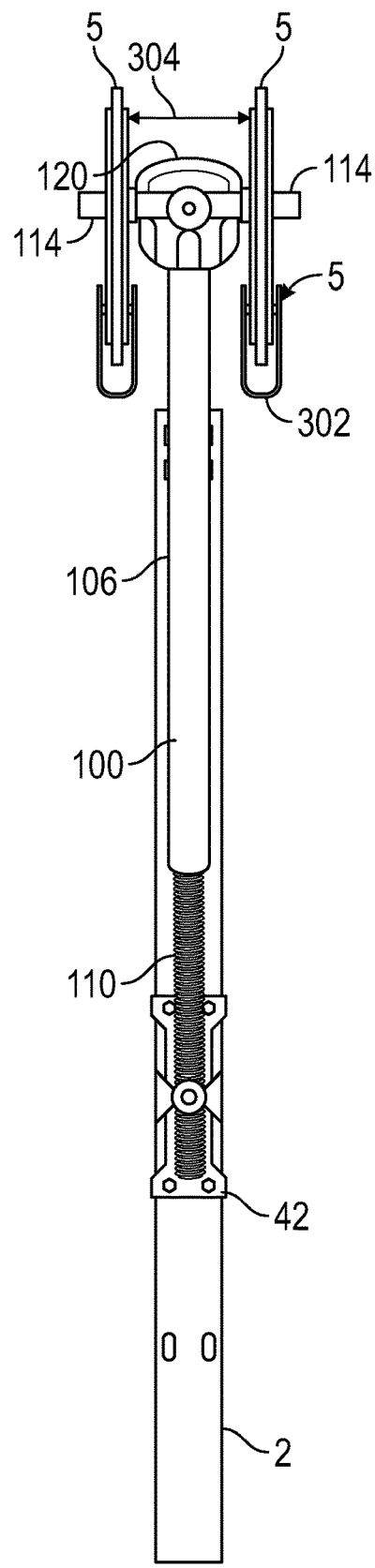
Figure 14E:
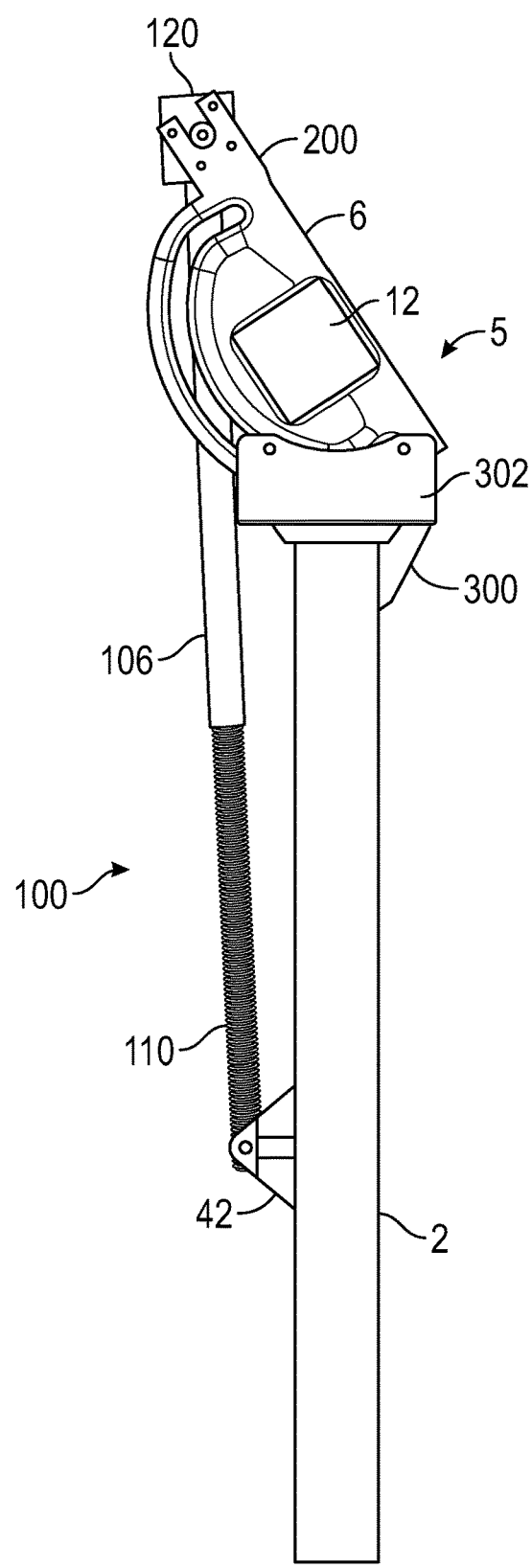

In operation the gap 304 allows for the gear box 120 to pass through the bearing 4 as the actuation system 100 moves from full extension as depicted in FIGS. 14B and 14E to full retraction as depicted in FIGS. 14C and 14G. In this way, the twisting and other detrimental forces experienced in the offset arrangement of FIG. 8C are eliminated.

The embodiment of FIGS. 14A-14G allows for the articulation system 100 to employ shorter actuators 102. Further, the piers 2 can be reduced in height, which reduces the overall height of the solar tracker 1. This in turn reduces the effects of wind loading experienced by the solar tracker 1. Still further, the embodiment of FIG. 14A-14G reduces the number of large components in the solar tracker 1, including for example the mass of material for any one rotatable part 5, because the load on the bearing 4 is now borne by two rotatable parts and two pair of engagement members 8.

Figure 15:
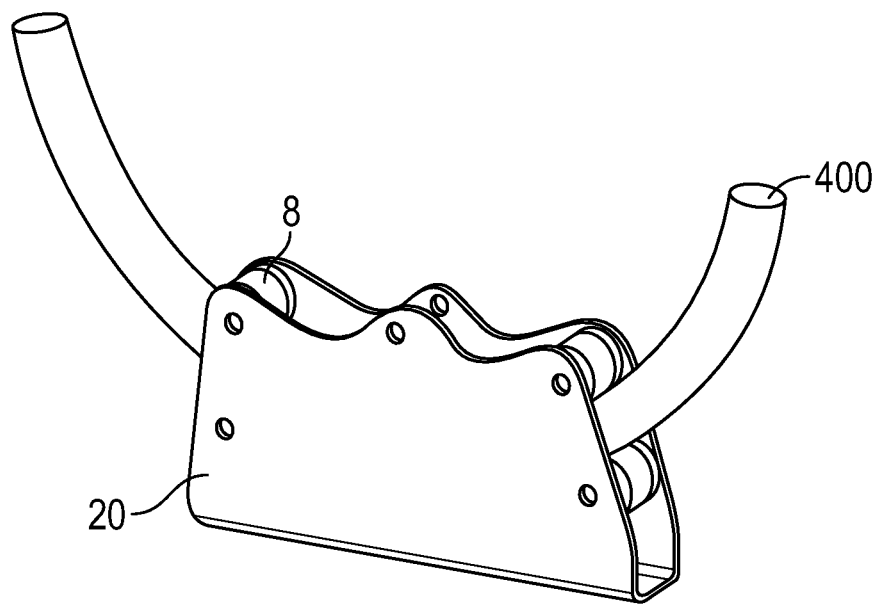
FIG. 15 depicts an alternative bearing employing a follower having multiple radii in accordance with the disclosure.

Though the bearing 4 is generally described herein as employing a rotatable part 5 that includes a slot 14, it will be appreciated that the slot 14 is not required to achieve the benefits of the disclosure and other means of effectuating a multiple-radius bearing assembly 4 can be achieved. As an example, rather than having two engagement members 8 ride in the slot 14 (FIG. 3), a similar outcome can be achieved utilizing a follower 400 captured between, for example, four engagement members 8 as depicted in FIG. 15. The follower 400 may be mounted to the torque tube 10 of the solar tracker 1. The follower 400 can have a shape which corresponds to anyone of the slots 14 depicted in FIGS. 9A-14G. As the actuation system 100 extends or retracts the follower 400 passes through the four engagement members 8 allowing the torque tube and solar modules 3 mounted thereon to rotate. The follower 400 with the multiple radii forces the torque tube 10 to follow an arcuate path as force is applied by the actuation system 100 to rotate the solar tracker 1. Following the change in radius of the follower 400, the center of rotation of the solar tracker changes and results at points in an unbalancing of the solar tracker 10 as described above, and achieves the benefits also described above. Though shown as a round bar, follower 400 is not so limited and may be formed by a flange located on the rotatable part 5 that is captured by the engagement members 8, or other configurations known to those of skill in the art.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A solar tracker bearing comprising:
   a first rotatable part, the rotatable part including a notch for receiving a torque tube;
   a slot, formed in the rotatable part and extending below the notch, the slot defining an arc having at least: (i) a first radius along a first arc length of the slot extending at least along a central portion of the slot and (ii) a second radius along a second, different arc length of the slot extending at least outward from both a first slot termination end portion and a second, opposite slot termination end portion and along the first arc length between the first slot termination end portion and the central portion and between the second slot termination end portion and the central portion;
   a first engagement member configured to be received in the slot; and
   at least one base configured to secure the engagement member in the slot and to secure the bearing to a pier, wherein the slot is configured such that the first rotatable part moves differently, relative to the pier to which the base is configured to be secured, when the engagement member is along the first arc length of the slot than when the engagement member is along the second, different arc length of the slot.

2. The solar tracker bearing of claim 1, wherein the first radius is at a bottom portion of the rotatable part, and the second radius is proximate at least one termination of the slot wherein the second radius is smaller than the first radius.

3. The solar tracker bearing of claim 1, wherein the first radius is at a bottom portion of the rotatable part, and the second radius is proximate at least one termination of the slot wherein the second radius is larger than the first radius.

4. The solar tracker bearing of claim 1, wherein the first radius is at a bottom portion of the rotatable part, and the second radius is proximate at least one termination of the slot wherein the second opposes the first radius.

5. The solar tracker bearing of claim 2, further comprising a third radius proximate a second termination, wherein the third radius is larger than the first radius.

6. The solar tracker bearing of claim 2, further comprising a third radius proximate a second termination, wherein the third radius opposes the first radius.

7. The solar tracker bearing of claim 1, further comprising a second rotatable part including a notch for receiving the torque tube.

8. The solar tracker bearing of claim 7, wherein the second rotatable part comprises a second slot extending below the notch and defining an arc having multiple radii, wherein the slot in the first rotatable part matches the slot in the second rotatable part.

9. The solar tracker bearing of claim 8, further comprising at least a second engagement member.

10. The solar tracker bearing of claim 9, wherein the first and second engagement member are received in a U-channel supported by the base to secure the first and second engagement members in their respective slots in the respective rotatable parts.

11. The solar tracker bearing of claim 10, wherein the first and second engagement members each comprise two engagement members.

12. The solar tracker bearing of claim 11, wherein each of the first and second rotatable parts include an actuator arm.

13. The solar tracker bearing of claim 12, wherein the first and second rotatable parts are separated from one another by a gap.

14. The solar tracker bearing of claim 13, wherein the gap is configured to receive a gear box of an articulation system.

15. The solar tracker bearing of claim 1, further comprising a notch offset from a centerline of the rotatable part.

16. The solar tracker bearing of claim 15, further comprising an actuator arm.

17. A single axis solar tracker comprising:
a torque tube;
a plurality of photovoltaic panels supported by the torque tube;
a plurality of piers, configured to support the torque tube and the photovoltaic panels; and
a plurality of solar tracker bearings including,
    at least one rotatable part, the rotatable part including a notch for receiving the torque tube;
    a slot, formed in the rotatable part and extending below the notch, the slot defining an arc having at least (i) a first radius along a first arc length of the slot extending at least along a central portion of the slot and (ii) a second radius along a second, different arc length of the slot extending at least outward from both a first slot termination end portion and a second, opposite slot termination end portion and along the first arc length between the first slot termination end portion and the central portion and between the second slot termination end portion and the central portion;
    at least one engagement member configured to be received in the slot; and
    at least one base configured to secure the engagement member in the slot and to secure the bearing to one of the plurality of piers,
    wherein the slot is configured such that the first rotatable part moves differently, relative to one of the plurality of piers, when the engagement member is along the first arc length of the slot than when the engagement member is along the second, different arc length of the slot.

18. The single axis solar tracker of claim 17, wherein the first radius is at a bottom portion of the rotatable part, and the second radius is proximate at least one termination of the slot wherein the second radius is smaller than the first radius.

19. The single axis solar tracker of claim 17, wherein first radius is at a bottom portion of the rotatable part, and the second radius is proximate at least one termination of the slot wherein the second radius is larger than the first radius.

20. The single axis solar tracker of claim 17, wherein the first radius is at a bottom portion of the rotatable part, and the second radius is proximate at least one termination of the slot wherein the second opposes the first radius.

* * * * *